United States Patent
Polyudov

(10) Patent No.: US 7,873,807 B1
(45) Date of Patent: Jan. 18, 2011

(54) RELOCATING A PROGRAM MODULE FROM NVRAM TO RAM DURING THE PEI PHASE OF AN EFI-COMPATIBLE FIRMWARE

(75) Inventor: Feliks Polyudov, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 1197 days.

(21) Appl. No.: 11/496,781

(22) Filed: Jul. 28, 2006

(51) Int. Cl.
 *G06F 12/00* (2006.01)
(52) U.S. Cl. ........................ 711/165; 711/154
(58) Field of Classification Search ............ 711/154, 711/165
See application file for complete search history.

(56) References Cited

U.S. PATENT DOCUMENTS

| | | | |
|---|---|---|---|
| 7,448,030 B2 * | 11/2008 | Liu et al. | 717/157 |
| 7,506,144 B2 * | 3/2009 | Zhao et al. | 713/1 |
| 7,584,374 B2 * | 9/2009 | Gu et al. | 713/323 |
| 2004/0158698 A1 * | 8/2004 | Rothman et al. | 713/1 |
| 2004/0215951 A1 * | 10/2004 | Chen et al. | 713/1 |
| 2007/0033322 A1 * | 2/2007 | Zimmer et al. | 711/103 |
| 2007/0055856 A1 * | 3/2007 | Zimmer et al. | 713/2 |

OTHER PUBLICATIONS

Specification entitled, Intel Platform Innovation Framework for EFI Pre-EFI Initialization Core Interface Specification (PEI CIS), dated Nov. 11, 2004, pp. 1-207, Version 0.91.
Specification entitled, Intel Platform Innovation Framework for EFI Driver Execution Environment Core Interface Specification (DXE CIS), dated Dec. 8, 2004, pp. 1-220, Vers 0.91.
Specification entitled, Intel Platform Innovation Framework for EFI Hand-Off Block (HOB) Specification, dated Sep. 16, 2003, pp. 1-39, Version 0.9.

* cited by examiner

*Primary Examiner*—Reba I Elmore
(74) *Attorney, Agent, or Firm*—Hope Baldauff Hartman, LLC

(57) ABSTRACT

Methods, apparatus, and computer-readable media for relocating a program module executing within a PEI phase from a NVRAM to a RAM are provided. According to one method, a program module is executed from NVRAM prior to RAM being initialized in the PEI phase. While the program module is executing from the NVRAM, it is operative to store an in-memory entry point in a hand-off block. When the RAM is initialized and becomes available in the PEI phase, the in-memory entry point for the module is retrieved from the hand-off block. The RAM address of the in-memory entry point is then calculated, and the program module is executed from the RAM at the calculated in-memory entry point.

16 Claims, 7 Drawing Sheets

RELOCATING A PROGRAM MODULE FROM NVRAM TO RAM DURING THE PEI PHASE OF AN EFI-COMPATIBLE FIRMWARE

BACKGROUND

In many computing systems, low-level instruction code is used as an intermediary between the hardware components of the computing system and the operating software and other high-level software executing on the computing system. In some computer systems, this low-level instruction code is known as the Basic Input and Output System ("BIOS"). The BIOS provides a set of software routines that allow high-level software to interact with the hardware components of the computing system using standard calls.

Because of limitations of the BIOS in many PC-compatible computers, a new specification for creating the firmware that is responsible for booting the computer and for intermediating the communication between the operating system and the hardware has been created. The new specification is called the Extensible Firmware Interface ("EFI") Specification and is available from INTEL CORPORATION. The original EFI Specification from INTEL CORPORATION is also being extended by the Unified Extensible Firmware Interface Forum ("UEFI").

The EFI Specification describes an interface between the operating system and the system firmware. In particular, the Specification defines the interface that platform firmware must implement and the interface that the operating system may use in booting. How the firmware implements the interface is left up to the manufacturer of the firmware. The EFI Specification provides mechanisms for EFI drivers to communicate with each other, and the EFI core provides functions such as allocation of memory, creating events, setting the clock, and many others. This is accomplished through a formal and complete abstract specification of the software-visible interface presented to the operating system by the platform and the firmware.

INTEL CORPORATION has also provided further details regarding a recommended implementation of EFI and UEFI in the form of The INTEL Platform Innovation Framework for EFI ("the Framework"). Unlike the EFI Specification, which focuses only on programmatic interfaces for the interactions between the operating to system and system firmware, the Framework is a group of specifications that together describe a firmware implementation that has been designed to perform the full range of operations that are required to initialize the platform from power on through transfer of control to the operating system.

The specifications that make up the Framework describe EFI firmware being executed in two major phases: the Pre-EFI Initialization ("PEI") phase and the Driver Execution Environment ("DXE") phase. PEI includes the minimum amount of program code needed to perform basic platform initialization and is executed from non-volatile memory. Pre-EFI Initialization modules ("PEIMs" or "modules") are specialized drivers that are executed during PEI. PEIMs are generally utilized to perform the actual hardware initialization that takes place during PEI. When PEI has completed its initialization, including the initialization of main memory, control passes to the DXE, which performs higher-level platform initialization and diagnostic functions. Because the bulk of the PEI processing is performed prior to memory initialization, very limited memory resources are available during most of the PEI phase.

While most of the work performed during the PEI phase is done prior to memory being initialized, it is necessary in some cases to perform PEI processing after memory has been initialized and made available for use. Because PEIMs are initially executed from a non-volatile memory ("NVRAM"), which is vastly slower than random-access memory ("RAM"), it is desirable in some cases to relocate PEIMs from NVRAM to RAM after the RAM has been initialized. This process, however, is difficult in an extremely memory-limited environment such as the PEI phase of an EFI-compatible firmware.

It is with respect to these considerations and others that the various embodiments of the invention have been made.

SUMMARY

The above and other problems are solved by methods, apparatus, and computer-readable media for relocating a program module executing within the PEI phase from an NVRAM to a RAM. As described herein, program modules that are being executed from NVRAM in the PEI phase can be relocated to and executed from RAM, thereby allowing them to provide faster processing and more advanced services.

According to one aspect of the disclosure presented herein, a method is provided for relocating a program module executing within a PEI phase from an NVRAM to a RAM. According to the method, the program module is executed from the NVRAM prior to RAM being initialized in the PEI phase. While the program module is executing from the NVRAM, it is operative to store an in-memory entry point. The in-memory entry point is the memory address at which the program module should be executed when it is relocated to RAM. The in-memory entry point is expressed as a memory address within the NVRAM.

According to other aspects of the method, when the RAM is initialized and becomes available in the PEI phase, the in-memory entry point for the module is retrieved. The module is loaded to RAM, the RAM address of the in-memory entry point is then calculated, and the program module is executed from the RAM at the calculated in-memory entry point. According to aspects, execution of the in-memory entry point may cause a function to be executed within the program module for re-installing a PEI module-to-PEI module interface ("PPI") that exposes the services of the program module. The services exposed by re-installing the PPI may be more advanced or more precise than the services exposed by the program module when executing from NVRAM.

According to other aspects of the method, the program module may store the in-memory entry point in a hand-off block ("HOB"), such as a globally unique identifier ("GUID") extension HOB. HOBs are provided for passing data from the PEI to the DXE. However, in the implementations described herein, a HOB is created by a program module that includes the in-memory entry point for the program module. The HOB may also include data indicating that the program module should be relocated to RAM when it becomes available. When the RAM becomes available in the PEIM phase, a search is made of the HOBs to identify those modules that should be relocated to RAM. The in-memory entry points for such modules are retrieved from the HOBs and utilized to launch the program modules from the RAM.

Aspects of the disclosure provided herein may also be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages will be apparent from a reading of the following detailed description and a review of the associated drawings.

DETAILED DESCRIPTION

Figure 1:
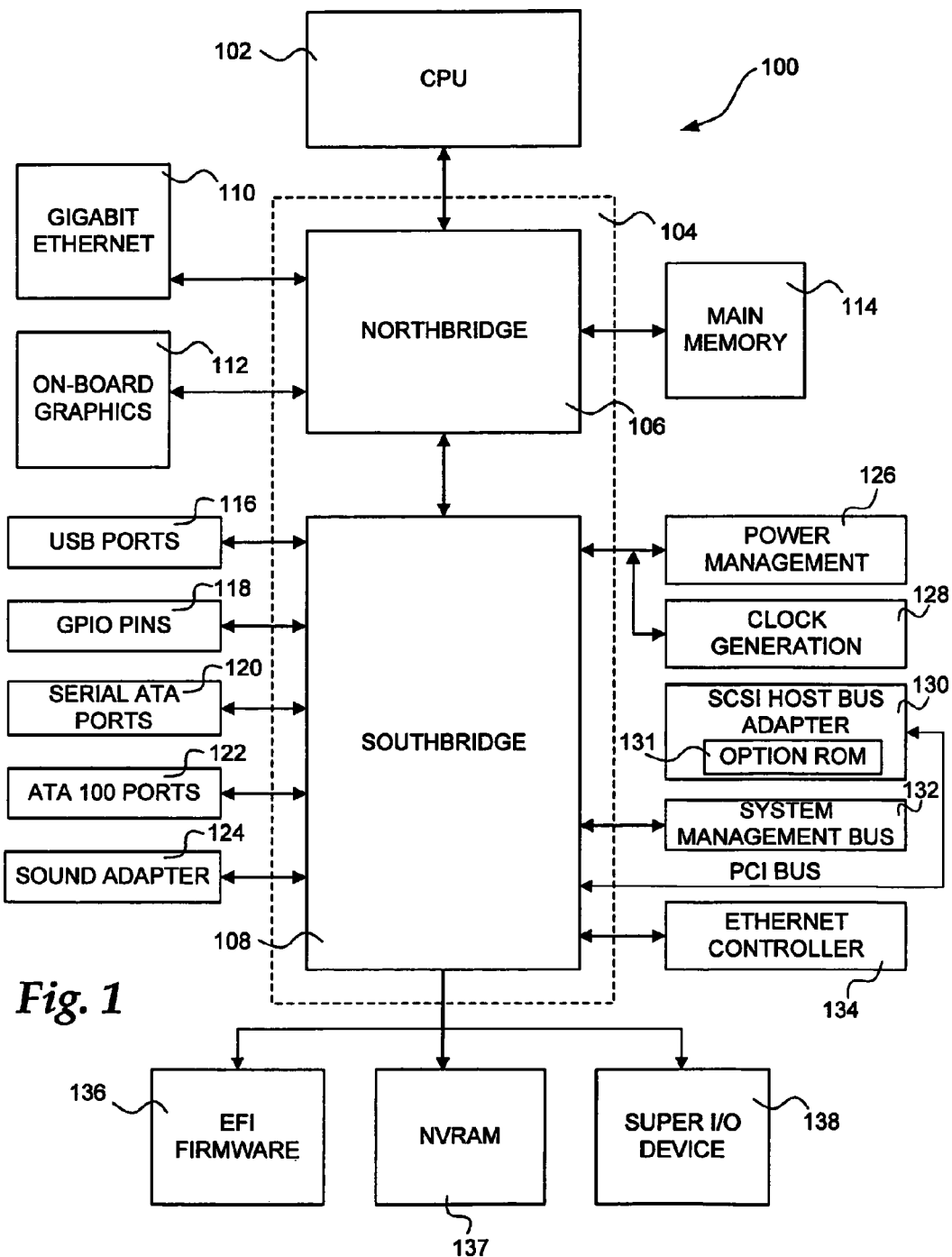
FIG. 1 is a computer architecture diagram that illustrates various components of a computer that provides an illustrative operating environment for the implementations presented herein.

Embodiments of the disclosure presented herein provide methods, systems, apparatuses, and computer-readable media for relocating a program module executing within the PEI phase from an NVRAM to a RAM. In the following detailed description, references are made to the accompanying drawings that form a part hereof, and in which are shown by way of illustration specific embodiments or examples. Referring now to the drawings, in which like numerals represent like elements throughout the several figures, aspects of an exemplary operating environment and the implementations provided herein will be described.

FIG. 1 and the following discussion are intended to provide a brief, general description of a suitable computing environment in which the invention may be implemented. While the invention will be described in the general context of program modules that execute in conjunction with the execution of a computer firmware, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for practicing the embodiments discussed herein will be described. It should be appreciated that although the embodiments described herein are discussed in the context of a conventional desktop or server computer, the embodiments may be utilized with virtually any type of computing device. FIG. 1 shows an illustrative computer architecture for a computer 100 that is operative to relocate a program module executing within the PEI phase from an NVRAM to a RAM.

In order to provide the functionality described herein, the computer 100 includes a baseboard, or "motherboard", which is a printed circuit board to which a multitude of components or devices may be connected by way of a system bus or other electrical communication path. In one illustrative embodiment, a central processing unit ("CPU") 102 operates in conjunction with a chipset 104. The CPU 102 is a standard central processor that performs arithmetic and logical operations necessary for the operation of the computer.

The chipset 104 includes a northbridge 106 and a southbridge 108. The northbridge 106 provides an interface between the CPU 102 and the remainder of the computer 100. The northbridge 106 also provides an interface to a random access memory ("RAM") used as the main memory 114 in the computer 100 and, possibly, to an on-board graphics adapter 112. The northbridge 106 may also include functionality for providing networking functionality through a gigabit Ethernet adapter 110. The gigabit Ethernet adapter 110 is capable of connecting the computer 100 to another computer via a network. Connections that may be made by the network adapter 110 may include local area network ("LAN") or wide area network ("WAN") connections. LAN and WAN networking environments are commonplace in offices, enterprise-wide computer networks, intranets, and the Internet. The northbridge 106 is connected to the southbridge 108.

The southbridge 108 is responsible for controlling many of the input/output functions of the computer 100. In particular, the southbridge 108 may provide one or more universal serial bus ("USB") ports 116, a sound adapter 124, an Ethernet controller 134, and one or more general purpose input/output ("GPIO") pins 118. The southbridge 108 may also provide a bus for interfacing peripheral card devices such as a BIOS boot system-compliant SCSI host bus adapter 130. In one embodiment, the bus comprises a peripheral component interconnect ("PCI") bus. The southbridge 108 may also provide a system management bus 132 for use in managing the various components of the computer 100. Power management circuitry 126 and clock generation circuitry 128 may also be utilized during the operation of the southbridge 108.

The southbridge 108 is also operative to provide one or more interfaces for connecting mass storage devices to the computer 100. For instance, according to an embodiment, the southbridge 108 includes a serial advanced technology attachment ("SATA") adapter for providing one or more SATA ports 120 and an ATA100 adapter for providing one or more ATA100 ports 122. The SATA ports 120 and the ATA100 ports 122 may be, in turn, connected to one or more mass storage devices storing an operating system and application programs. As known to those skilled in the art, an operating system comprises a set of programs that control operations of a computer and allocation of resources. An application program is software that runs on top of the operating system software and uses computer resources made available through the operating system to perform application specific tasks desired by the user.

The mass storage devices connected to the southbridge 108 and the SCSI host bus adapter 130, and their associated computer-readable media, provide non-volatile storage for the computer 100. Although the description of computer-readable media contained herein refers to a mass storage device, such as a hard disk or CD-ROM drive, it should be appreciated by those skilled in the art that computer-readable media can be any available media that can be accessed by the computer 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the southbridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a computer storage media such as a ROM or a flash memory such as a non-volatile random access memory ("NVRAM") for storing the firmware 136 that includes program code containing the basic routines that help to start up the computer 100 and to transfer information between elements within the computer 100. The EFI firmware 136 comprises a firmware that is compatible with the EFI Specification and the Framework. Additional details regarding the operation of the EFI firmware 136 are provided below with respect to FIGS. 2-4. The LPC interface may also be utilized to connect a NVRAM 137 to the computer 100. The NVRAM 137 may be utilized by the firmware 136 to store configuration data for the computer 100. The configuration data for the computer 100 may also be stored on the same NVRAM 137 as the firmware 136.

It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
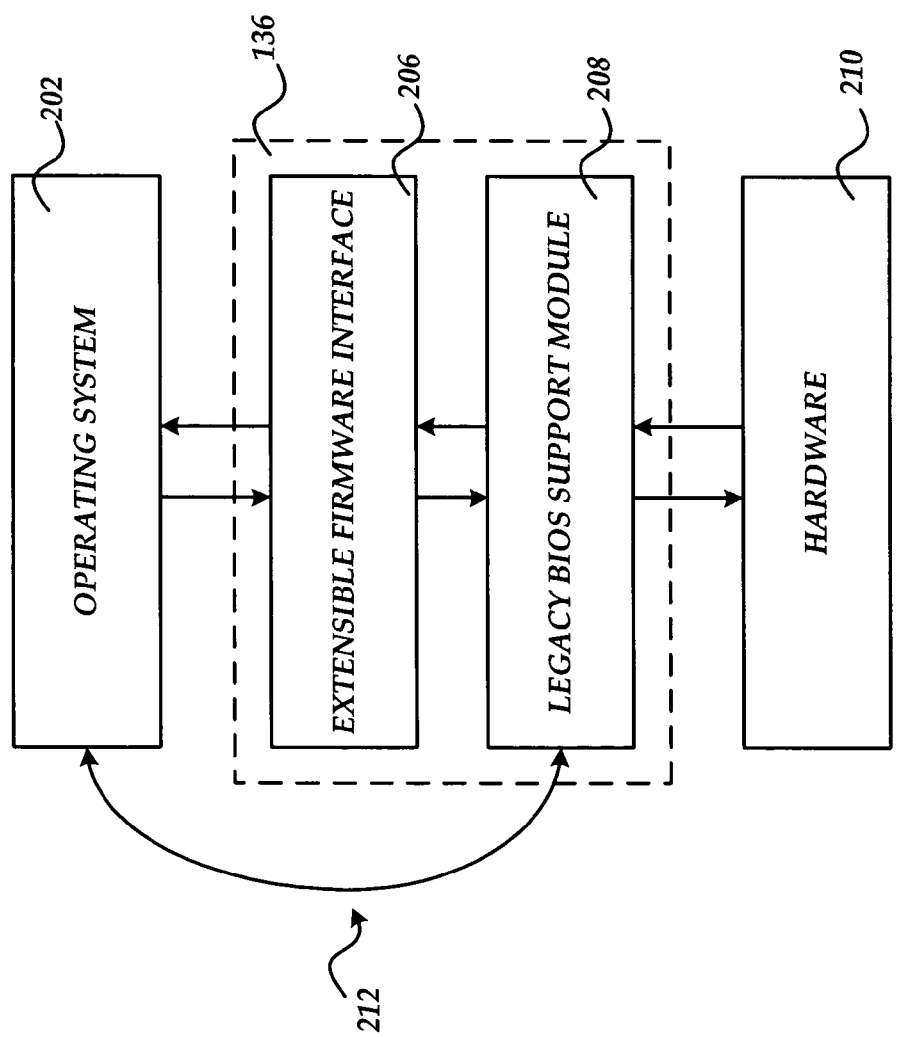
FIGS. 2-4 are software architecture diagrams that illustrate aspects of an EFI environment utilized by the embodiments presented herein.

Referring now to FIG. 2, additional details regarding the operation of the EFI firmware 136 will be described. As described above, the firmware 136 comprises a firmware compatible with the EFI Specification from INTEL CORPORATION or from the UEFI FORUM. The EFI Specification describes an interface between the operating system 202 and the system firmware 136. The EFI Specification defines the interface that platform firmware must implement, and the interface that the operating system 202 may use in booting. How the firmware 136 implements the interface is left up to the manufacturer of the firmware. The intent of the Specification is to define a way for the operating system 202 and firmware 136 to communicate only information necessary to support the operating system boot process. This is accomplished through a formal and complete abstract Specification of the software-visible interface presented to the operating system by the platform and the firmware.

According to one implementation of EFI on INTEL CORPORATION IA-32 platforms, both the EFI 206 and a legacy BIOS support module 208 may be present in the firmware 136. This allows the computer 100 to support an EFI firmware interface and a legacy BIOS firmware interface. In order to provide this functionality, an interface 212 may be provided for use by legacy operating systems and applications. Additional details regarding the architecture and operation of the EFI 204 are provided below with respect to FIGS. 3-4. Additional details regarding the operation and architecture of EFI can be found in the EFI Specification and in the specifications that make up the Framework, both of which are available from INTEL CORPORATION end expressly incorporated herein by reference.

Figure 3:
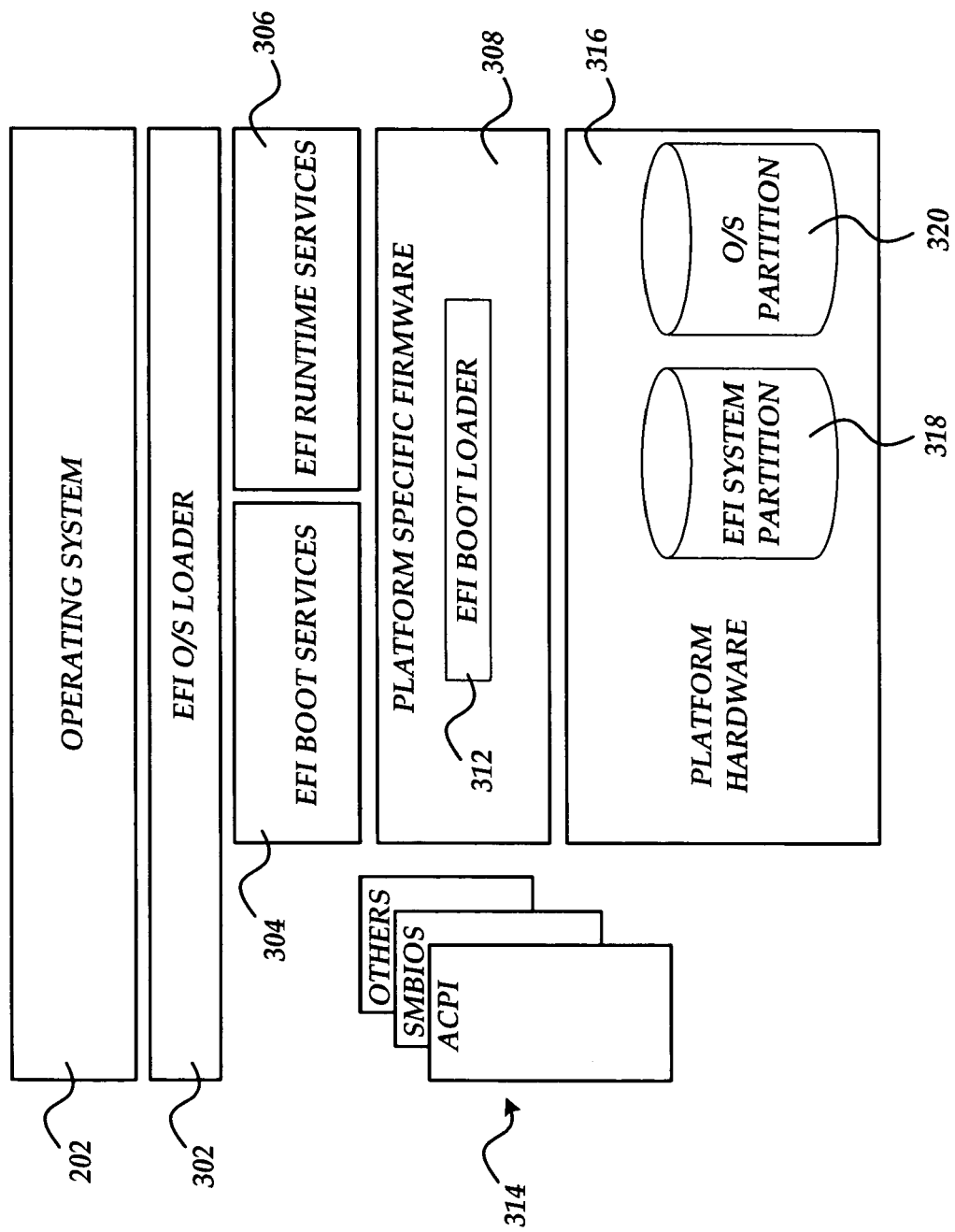

Turning now to FIG. 3, additional details regarding an EFI Specification-compliant system utilized to provide an operating environment for the various embodiments presented herein will be described. As shown in FIG. 3, the system includes platform hardware 316 and an operating system 202. The platform firmware 308 may retrieve an OS image from the EFI system partition 318 using an EFI O/S loader 302. The EFI system partition 318 may be an architecturally shareable system partition. As such, the EFI system partition 318 defines a partition and file system that are designed to allow safe sharing of mass storage between multiple vendors. An O/S partition 320 may also be utilized.

Once started, the EFI O/S loader 302 continues to boot the complete operating system 202. In doing so, the EFI O/S loader 302 may use EFI boot services 304 and interface to other supported specifications to survey, comprehend, and initialize the various platform components and the operating system software that manages them. Thus, interfaces 314 from other specifications may also be present on the system. For example, the Advanced Configuration and Power Management Interface ("ACPI") and the System Management BIOS ("SMBIOS") specifications may be supported.

EFI boot services 304 provides interfaces for devices and system functionality that can be used during boot time. EFI runtime services 306 may also be available to the O/S loader 302 during the boot phase. For example, a minimal set of runtime services may be presented to ensure appropriate abstraction of base platform hardware resources that may be needed by the operating system 202 during its normal operation. EFI allows extension of platform firmware by loading EFI driver and EFI application images which, when loaded, have access to all EFI-defined runtime and boot services.

Various program modules provide the boot and runtime services. These program modules may be loaded by the EFI boot loader 312 at system boot time. The EFI boot loader 312 is a component in the EFI firmware that determines which program modules should be explicitly loaded and when. Once the EFI firmware is initialized, it passes control to the boot loader 312. The boot loader 312 is then responsible for determining which of the program modules to load and in what order.

Figure 4:
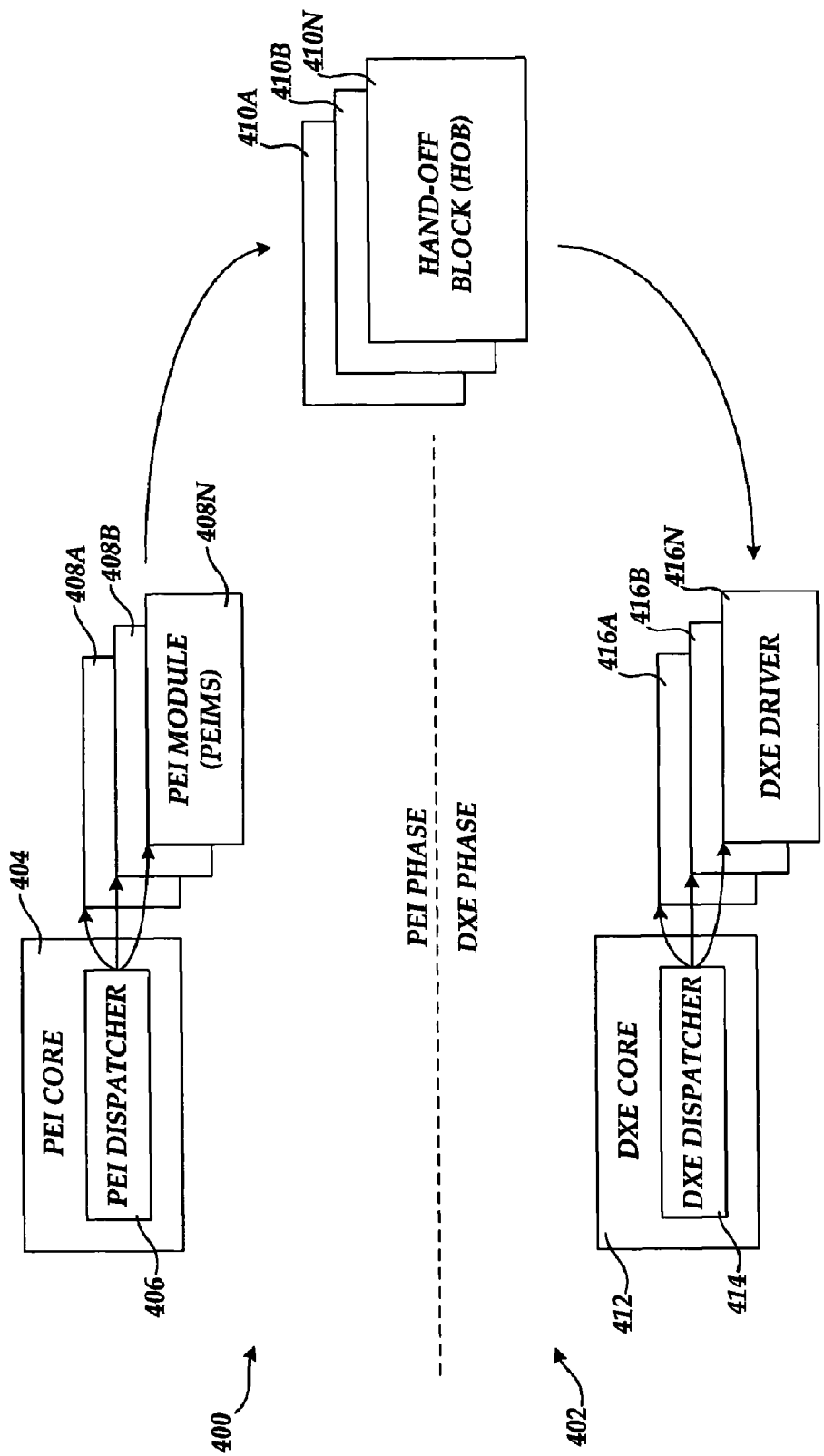

Referring now to FIG. 4, details regarding the various phases of execution of the EFI firmware 136 will be described. As discussed briefly above, an EFI firmware compatible with the Framework is executed in two major phases: the PEI phase 400 and the DXE phase 402. The PEI phase 400 includes the minimum amount of program code needed to perform basic platform initialization and is executed from non-volatile memory. Because the main memory 114 has not yet been initialized when the PEI phase 400 begins, the bulk of the program code executed during the PEI phase 400 is executed from the NVRAM 137. Execution of program code from the NVRAM 137 is orders of magnitude slower than execution from the main memory 114.

The operation of the PEI phase is controlled by core code called the PEI core 404. The PEI core 404 includes a PEI dispatcher 406 that is operative to identify and launch program modules within the PEI phase 400. More particularly, one or more PEI modules ("PEIMs") 408A-408N may be utilized by the PEI core 404. The PEIMs 408A-408N are specialized plug-ins that execute within the PEI phase 400 in order to customize the operation of the PEI phase 400 to the platform. The PEIMs 408A-408N may also register PPIs with the PEI core 404 so that other modules may locate and utilize the services they provide.

The PEI core 404 and the PEI dispatcher 406 provide functionality for locating, validating, and dispatching the PEIMs 408A-408N, facilitating communication between the PEIMs 408A-408N, and providing handoff data in the form of hand-off blocks ("HOBs") 410A-410N to the DXE phase 402, which is described below. The PEIMs 408A-408N are typically executed from the NVRAM 137 during the PEI phase 400. As described in greater detail below, however, according to the implementations presented herein, the PEIMs 408A-408N can request to be relocated to the main memory 114 when it is initialized and becomes available for use.

When the PEI phase 400 has completed its initialization, including the initialization of main memory, control passes to the DXE phase 402, which performs higher-level platform initialization and diagnostic functions. The operation of the DXE phase 402 is controlled by core code called the DXE core 412. The DXE core 412 is a boot service image that is responsible for producing EFI boot services, EFI runtime services, and DXE services. The DXE core 412 includes a DXE dispatcher 414 that discovers the DXE drivers 416A-416N stored in firmware volumes and executes them in the proper order.

The DXE drivers 416A-416N are required to initialize the processor, chipset, and platform. They are also required to produce DXE architectural protocols and any additional protocol services required to produce I/O abstractions and boot devices. The DXE drivers 416A-416N are the components that actually initialize the platform and provide the services required to boot an EFI-compliant operation system or a set of EFI-compliant system utilities. The DXE drivers 416A-416N may also expose their services for use by other DXE drivers through the use of a protocol interface.

As mentioned briefly above, the PEI phase 400 is operative to allocate a data store that is passed to the DXE phase 402 when the DXE phase 402 is invoked from the PEI phase 400. The basic container of data storage utilized for this purpose is called a hand-off block. The HOBs 410A-410N are allocated during the PEI phase 400 and passed to the DXE phase 402. The HOBs 410A-410N are allocated sequentially in memory that is available to executable content in the PEI phase 400. The sequential list of HOBs 410A-410N in memory are referred to as a HOB list.

A pointer to the list of HOBs 410A-410N is passed to the DXE phase 400 at the conclusion of the PEI phase 400. In this manner, data may be produced in the PEI phase 400 and utilized in the DXE phase 402. In this regard, the PEI phase 400 is considered a HOB producer phase and the DXE phase 402 is considered a HOB consumer phase. Additional details regarding the construction and use of hand-off blocks can be found in the INTEL Platform Innovation Framework for EFI Hand-Off Block Specification (the "HOB Specification"), which is publicly available from INTEL corporation.

As will be described in detail below, in the embodiments presented herein, a HOB may be utilized by a PEIM to indicate that it should be reloaded in the main memory 114 when it is initialized and made available for use. The HOB may also be utilized to provide information on the location of the PEIM and instructions regarding the memory address at which the PEIM should be launched from once it has been relocated to RAM. Additional details regarding this process are provided below with reference to FIGS. 5-7.

Figure 5:
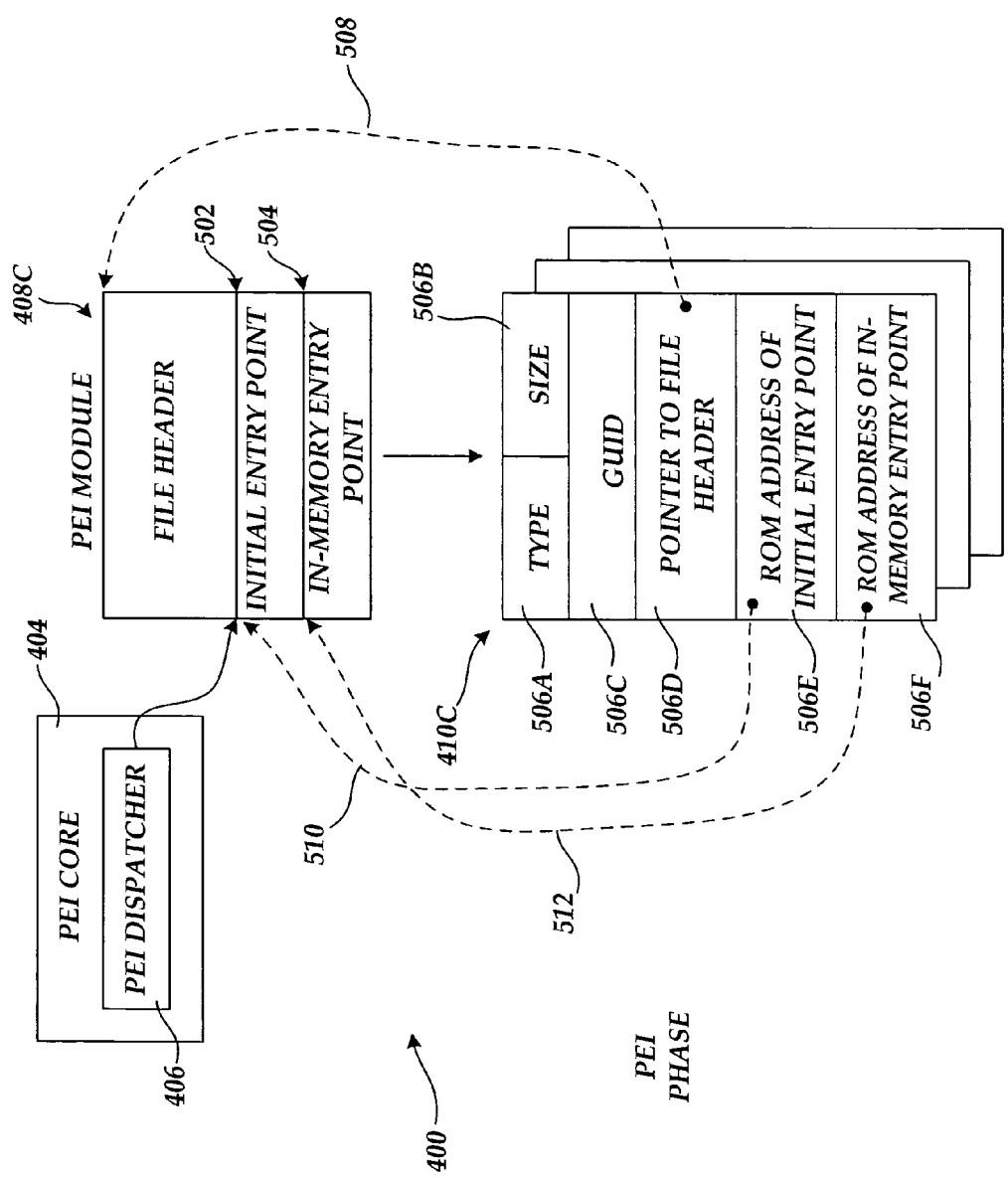
FIGS. 5-6 are software architecture diagrams that illustrate aspects of a firmware capable of relocating a program module from NVRAM to RAM during a PEI phase of execution.

Referring now to FIG. 5, additional details will be provided regarding one embodiment of the invention for relocating a program module from NVRAM to RAM during the PEI phase 400. In particular, FIG. 5 shows aspects of a module 408C that is operable to be executed from both the NVRAM 137 and the main memory 114 during the PEI phase 400. In order to enable this functionality, the module 408C exposes an in-memory entry point 504. The in-memory entry point 504 is an entry point into the module 408C at which execution of the module 408C is started once the module 408C has been relocated to the main memory 114. Program code executed when a call is made to the in-memory entry point 504 may include, for instance, program code for initializing the module 408C for operation from RAM. As an example, the module 408C may re-install a PPI for exposing its services to other modules executing within the PPI phase 400. In particular, a function may be executed when the in-memory entry point 504 is called for re-installing a PPI for the module 408C. Through the re-installation of the PPI, the function may expose more advanced or higher precision services of the module 408C than were exposed when the module 408C was first installed the PPI. In this manner, the module 408C can provide one level of functionality while executing from the NVRAM 137 and another level of functionality when it is relocated and executed from RAM.

In order to make the memory address of the in-memory entry point 504 available to the PEI dispatcher 406, the module 408C is operative to create a HOB 410C during its initialization in the PEI phase 400. The HOB 410C includes a data field 506A for storing type data that identifies the type of the HOB 410C.

The HOB 410C also includes a data field 506B for storing data indicating the size of the data payload of the HOB 410C. The HOB 410C may also include a data field 506C that includes a GUID for the HOB 410C. The type data and GUID indicate that the module 408C should be relocated to the RAM when the RAM becomes available for use. The HOB 410C also includes a data field 506F that is utilized to store a pointer 512 to the in-memory entry point 504. According to embodiments, the HOB 410C may be implemented as a GUID Extension HOB as provided for in the HOB Specification. When the HOB 410C is implemented as a GUID Extension HOB, the contents of the data field 506C are utilized to determine the type of information stored in the HOB. For example, a GUID may be stored in the field 506C that indicates that the corresponding PEIM should be relocated from NVRAM to RAM when memory becomes available. In particular, all PEIMs that are to be reallocated from NVRAM to RAM should set the GUID stored in the data field 506C to REALLOCATE_GUID. In this manner, the data field 506C is utilized to indicate the type of data stored in the GUID Extension HOB.

According to aspects, the module 408C also includes an initial entry point 502. The initial entry point 502 is an entry point into the module 408C at which execution of the program module 408C is started when the module 408C is initially executed from the NVRAM 137 in the PEI phase 400. Program code located at the initial entry point 502 may include, for instance, program code for initializing the operation of the module 408C in the PEI phase 400, registering a PPI for exposing the services provided by the module 408C, and for performing other functions. A pointer 510 to the initial entry point 502 may be specified in the field 506E of the HOB 410C. A pointer 508 to the file header of the module 408C may also be stored in the field 506D of the HOB 410C.

Figure 6:
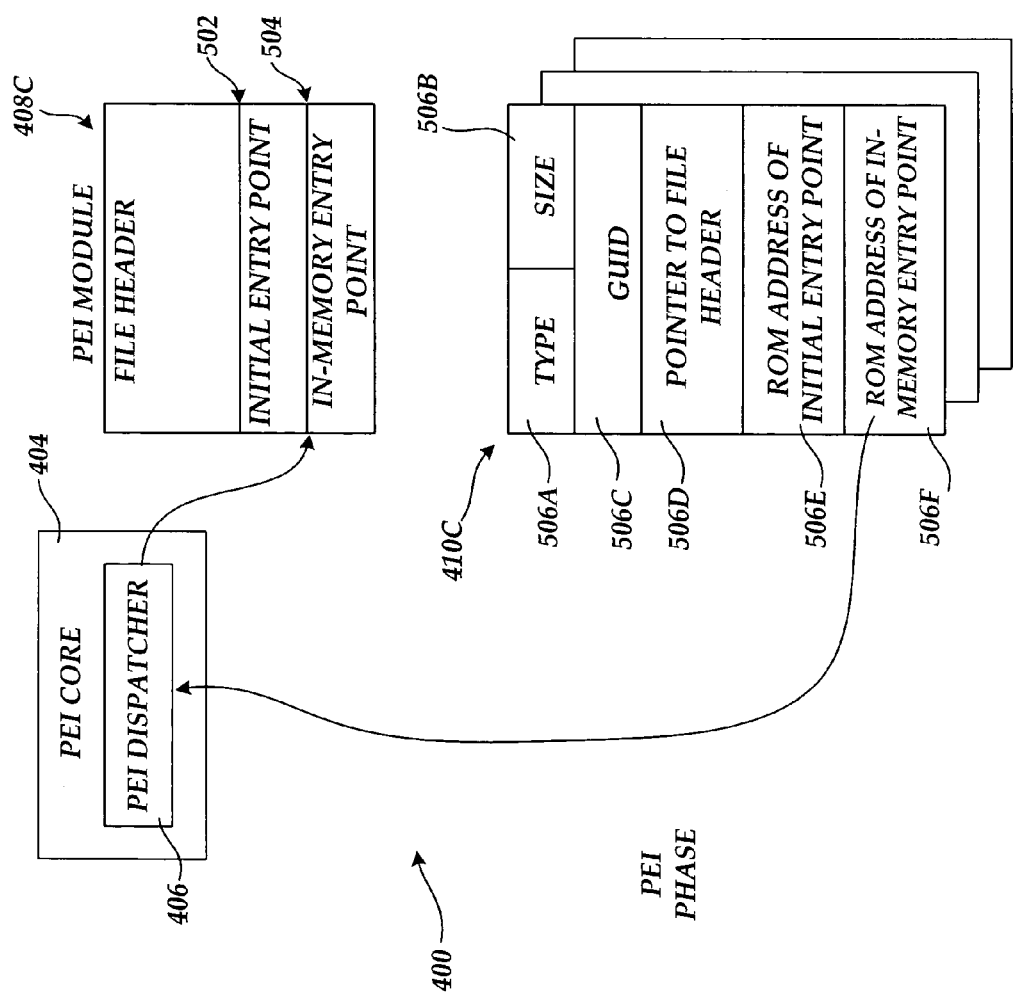

Referring now to FIG. 6, additional details will be provided regarding one implementation provided herein for relocating a program module executing in the PEI phase 400 from NVRAM to RAM. In particular, as shown in FIG. 6, when the main memory 114 becomes available for use in the PEI phase 400, the PEI dispatcher 406 is operative to identify the HOBs provided by modules that should be moved from the NVRAM 137 to the main memory 114. The PEI dispatcher 406 is then operative to copy the modules to the main memory 114. The PEI dispatcher then retrieves the memory address of the in-memory entry point 504 for these modules from the data field 506F of the appropriate HOB, and executes the modules in RAM from the in-memory entry point 504. In this manner, the same module can be executed from the NVRAM and the RAM during the PEI phase 400.

Figure 7:
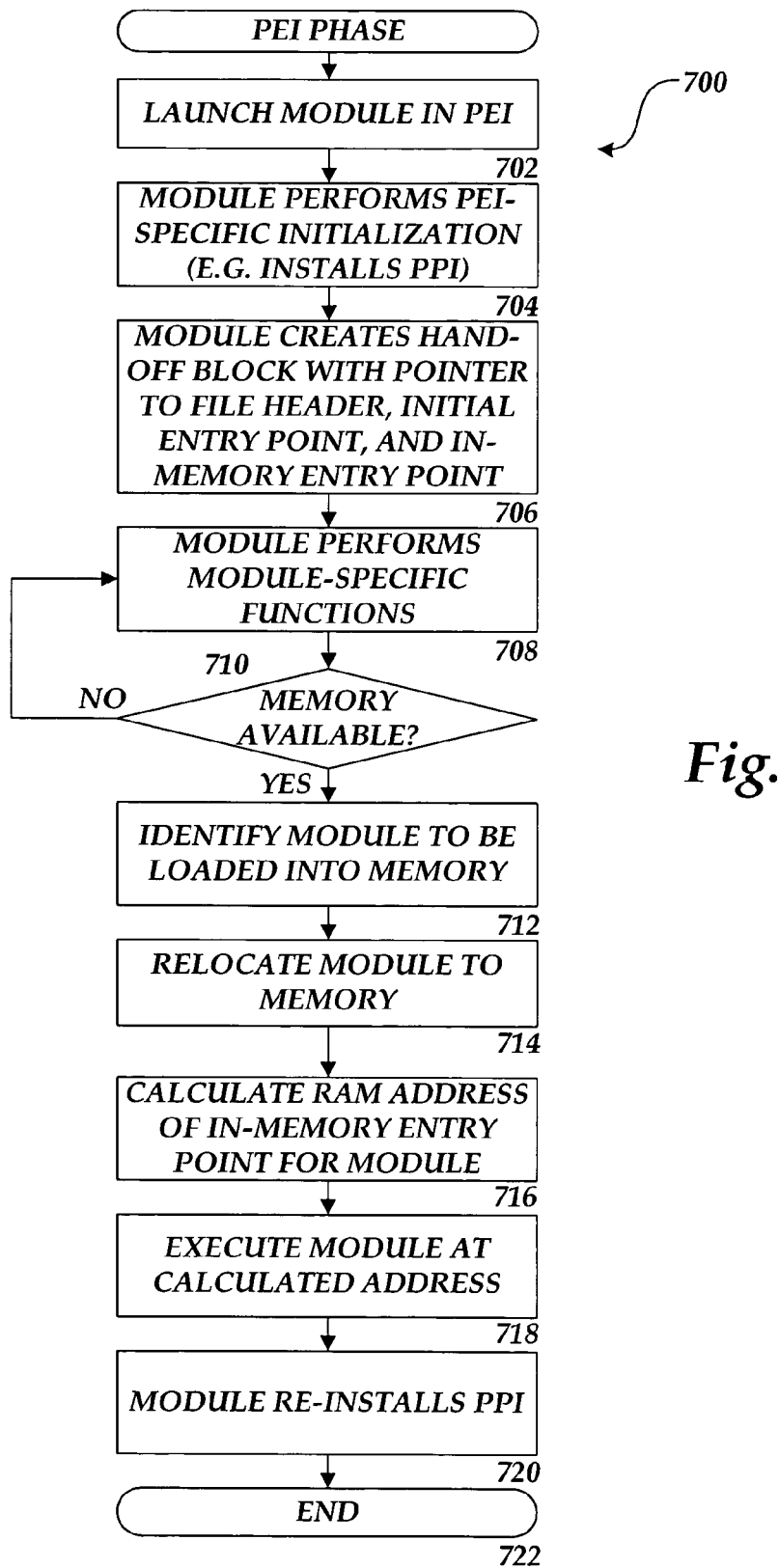
FIG. 7 is a flow diagram showing an illustrative routine for relocating a program module executing within the PEI phase from an NVRAM to a RAM.

According to one implementation, the addresses stored in the fields 506D-506F are expressed as addresses within the NVRAM 137. Accordingly, when the program module 408C is copied to the main memory 114, the addresses stored in the HOB 410C must be adjusted to reflect their new locations in RAM. In order to perform this functionality, the PEI dispatcher 406 is operative to calculate the difference (the "delta") between the starting location of the module 408C in ROM and its new starting location in RAM. The delta is then added to the addresses stored in the fields 506D-506F to obtain the correct RAM addresses. The correct RAM address of the in-memory entry point is then utilized to begin executing the module 408C at the in-memory entry point 504. FIG. 7, described below, provides additional details regarding one illustrative process provided herein for relocating a program module from NVRAM to RAM during the execution of the PEI phase 400.

Referring now to FIG. 7, an illustrative routine 700 will be described in detail for relocating a program module from an NVRAM to a RAM after main memory becomes available during the PEI phase 400. The logical operations of the various embodiments described herein are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the embodiments described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 700 begins at operation 702, where the module 408C is launched in the PEI phase 400 from the NVRAM 137. At operation 704, the module 408C performs its PEI-specific initialization. For instance, the module 408C may install a PEIM-to-PEIM interface ("PPI") to expose its services to other modules executing within the PEI phase 400. As discussed above, the services exposed while the module 408C is being executed from the NVRAM 137 may provide one level of functionality. When the module is reloaded from the main memory 114, the module 408C may re-install the PPI to expose services providing a higher level of functionality.

As a part of its initialization, the module 408C may also create the HOB 410C. As discussed above, the HOB 410C includes a pointer 512 to the in-memory entry point 504, a pointer 510 to the initial entry point 502, and a pointer 508 to the file header of the module 408C. This occurs at operation 706. Once the module 408C creates the HOB 410C and populates its fields with the appropriate data, the routine 700 continues from operation 706 to operation 708.

At operation 708, the module 408C performs its module-specific PEI phase functions. This continues until such time as the main memory 114 becomes available for use in the PEI phase 400. Once the main memory 114 becomes available in the PEI phase 400, the routine 700 continues from operation 710 to operation 712. At operation 712, the PEI dispatcher 406 searches the HOB list to locate HOBs created by modules, such as the module 408C, that should be relocated to RAM. Once the HOBs to be relocated have been identified, the routine 700 continues to operation 714, where the identified modules are copied from the NVRAM 137 to the main memory 114.

Once the modules to be relocated to RAM have been copied from the NVRAM to the RAM, the address of the in-memory entry point for each module is calculated as a RAM memory address. This is performed in the manner discussed above with reference to FIG. 5. Once the appropriate RAM address has been calculated at operation 716, the routine 700 continues to operation 718 where the modules are executed from RAM at their adjusted in-memory entry point. When the modules are executed, they are operative to re-install a PPI exposing additional or more advanced services. This occurs at operation 720. Once the modules have re-installed their PPIs, the modules continue performing their module-specific services until the PEI phase 400 has completed. From operation 720, the routine 700 continues to operation 722, where it ends.

It should be appreciated that embodiments described herein provide methods, systems, apparatus, and computer-readable media for relocating a PEI program module from NVRAM to RAM in an EFI environment. Although the disclosure presented herein has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

I claim:

1. A method for relocating a program module executing within a pre-extensible firmware interface initialization (PEI) phase from a non-volatile memory (NVRAM) to a random access memory (RAM), the method comprising:
executing the program module from the NVRAM in the PEI phase;
while executing the program module in the PEI phase, storing an in-memory entry point for executing the program module from the RAM once the RAM becomes available in the PEI phase; and
when the RAM becomes available in the PEI phase, loading the program module into the RAM from the NVRAM, retrieving the stored in-memory entry point, and executing the program module in the PEI phase from the RAM at the in-memory entry point.

2. The method of claim 1, wherein storing an in-memory entry point for executing the program module from the RAM in the PEI comprises creating a hand-off block (HOB) containing the in-memory entry point for the program module.

3. The method of claim 2, wherein the HOB comprises a globally unique identifier (GUID) extension HOB.

4. The method of claim 3, wherein the in-memory entry point is expressed as an NVRAM memory address, and wherein executing the program module from RAM at the in-memory entry point comprises:
    calculating the RAM address of the stored in-memory entry point; and
    executing the program module from the calculated RAM address.

5. The method of claim 4, wherein, in response to being executed from the RAM at the in-memory entry point, the program module is operative to re-install a PEI module-to-PEI module interface (PPI) in the PEI phase.

6. The method of claim 5, wherein the program module further comprises an initial entry point for executing the program module from the NVRAM and wherein the initial entry point is also stored in the HOB.

7. A method for relocating a program module executing within a pre-extensible firmware interface initialization (PEI) phase from a non-volatile memory (NVRAM) to a random access memory (RAM), the method comprising:
    executing the program module from the NVRAM in the PEI phase; and
    creating a hand-off block (HOB) during the execution of the program module from NVRAM in the PEI phase, the HOB identifying the module as a module that should be relocated to and executed from RAM when the RAM becomes available, and storing an in-memory entry point for executing the program module from the RAM in the PEI phase.

8. The method of claim 7, further comprising retrieving the in-memory entry point from the HOB after RAM is available in the PEI phase, and executing the program module from RAM at the in-memory entry point.

9. The method of claim 8, wherein executing the program module from RAM at the in-memory entry point during the PEI phase comprises copying the program module from the NVRAM to the RAM, calculating a RAM address of the stored in-memory entry point, and executing the program module from the calculated RAM address.

10. The method of claim 9, wherein, in response to being executed at the entry point memory address, the program module is operative to re-install a PEI module-to-PEI module interface (PPI) in the PEI phase.

11. The method of claim 10, wherein the program module further comprises an initial entry point utilized for executing the program module from NVRAM in the PEI phase, and wherein the initial entry point is also stored in the HOB.

12. A computer storage medium having computer-executable instructions stored thereon which, when executed by a computer, cause the computer to:
    execute a firmware in a pre-extensible firmware interface initialization (PEI) phase;
    during the PEI phase, execute the firmware to retrieve an in-memory entry point for a program module that should be executed from a non-volatile memory (NVRAM) before a random access memory (RAM) becomes available in the PEI phase, and from the RAM after the RAM becomes available during the PEI phase;
    copy the program module from the NVRAM to the RAM when the RAM becomes available in the PEI phase; and
    execute the program module from the RAM at the in-memory entry point.

13. The computer storage medium of claim 12, wherein the in-memory entry point is stored in a hand-off block (HOB) created by the program module during its execution in the PEI phase.

14. The computer storage medium of claim 13, wherein the HOB further comprises data indicating that the program module should be executed from the NVRAM before the RAM becomes available in the PEI phase and also executed from the RAM after the RAM becomes available during the PEI phase.

15. The computer storage medium of claim 14, wherein the program module is operative to re-install a PEI module-to-PEI module interface (PPI) in the PEI phase in response to being executed from RAM at the in-memory entry point.

16. The computer storage medium of claim 13, wherein the HOB comprises a globally unique identifier (GUID) extension HOB.

* * * * *